United States Patent
Kwon et al.

(10) Patent No.: US 9,176,906 B2
(45) Date of Patent: Nov. 3, 2015

(54) MEMORY CONTROLLER AND MEMORY SYSTEM INCLUDING THE SAME

(71) Applicant: SK hynix Inc., Icheon-si, Gyeonggi-do (KR)

(72) Inventors: Yong Kee Kwon, Icheon-si (KR); Hyung Dong Lee, Icheon-si (KR); Young Suk Moon, Icheon-si (KR); Hyung Gyun Yang, Icheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 261 days.

(21) Appl. No.: 13/943,912

(22) Filed: Jul. 17, 2013

(65) Prior Publication Data

US 2014/0181449 A1 Jun. 26, 2014

(30) Foreign Application Priority Data

Dec. 21, 2012 (KR) .................. 10-2012-0150607

(51) Int. Cl.
*G06F 12/00* (2006.01)
*G06F 13/16* (2006.01)
*G06F 12/06* (2006.01)
*G06F 12/02* (2006.01)

(52) U.S. Cl.
CPC ........ *G06F 13/1631* (2013.01); *G06F 12/0207* (2013.01); *G06F 12/06* (2013.01); *G06F 12/0623* (2013.01)

(58) Field of Classification Search
CPC .. G06F 12/0207; G06F 12/06; G06F 12/0623
See application file for complete search history.

(56) References Cited

U.S. PATENT DOCUMENTS

| 6,205,155 | B1 | 3/2001 | Parrella et al. |
| 2003/0204651 | A1 | 10/2003 | Kuronuma et al. |
| 2009/0150624 | A1 | 6/2009 | Resnick |
| 2014/0006703 | A1* | 1/2014 | Bains et al. .................. 711/106 |

* cited by examiner

*Primary Examiner* — Shawn X Gu
(74) *Attorney, Agent, or Firm* — William Park & Associates Ltd.

(57) ABSTRACT

A memory system includes a memory unit and a memory controller. The memory unit includes a plurality of memory banks, wherein an information stored in a memory bank is accessed via a word line and a bit line. The memory controller is configured to limit repetitive accessing of a same word line or a same bit line so that the number of consecutive access is less than a predetermined critical value.

18 Claims, 6 Drawing Sheets

MEMORY CONTROLLER AND MEMORY SYSTEM INCLUDING THE SAME

CROSS-REFERENCES TO RELATED APPLICATION

The present application claims priority under 35 U.S.C. §119(a) to Korean application number 10-2012-0150607 filed on Dec. 21, 2012, in the Korean Intellectual Property Office, which is incorporated herein by reference in its entirety.

BACKGROUND

1. Technical Field

Various embodiments relate to a memory controller, and more particularly, to a memory controller and a memory system including the same.

2. Related Art

In order to improve the communication speed between a memory apparatus and a processor such as central processing unit (CPU) or graphics processing unit (GPU), a memory controller or interface chip has been used. Furthermore, a system-in-package (SIP) semiconductor apparatus in which a memory apparatus and a memory controller or interface chip are packaged together has been developed.

Figure 1:
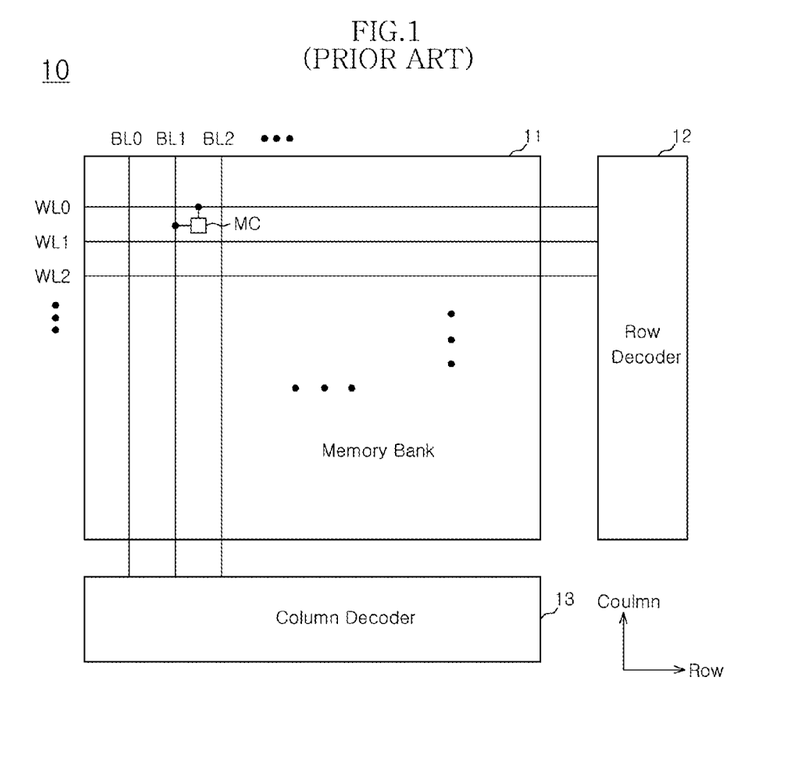
FIG. 1 schematically illustrates the configuration of a conventional memory unit.

Referring to FIG. 1, the memory unit 10 may include a memory bank 11 having a plurality of memory cells to store data. The memory cells MC may be electrically connected to word lines WL0, WL1, and WL2 in a row direction and bit lines BL0, BL1, and BL2 in a column direction (please check them), and located at the respective intersections between the word lines WL0, WL1, and WL2 and the bit lines BL0, BL1, and BL2. The word lines WL0, WL1, and WL2 and the bit lines BL0, BL1, and BL2 may be accessed by a row decoder 12 and a column decoder 13, respectively. The row decoder 12 may access a corresponding word line WL0, WL1, or WL2 according to a row address signal, and the column decoder 13 may access a corresponding bit line BL0, BL1, or BL2 according to a column address.

With the increase in integration-density of the memory apparatus, the number of memory cells has geometrically increased. Accordingly, the numbers of word lines and bit lines have also increased. That is, size of the memory cells, a distance between the word lines WL0, WL1, and WL2, and a distance between the bit lines BL0, BL1, and BL2 have been significantly reduced. Therefore, when specific word lines or bit lines are successively accessed, memory cells electrically connected to an adjacent word line or bit line may be influenced. That is, as the specific word lines or bit lines are successively accessed, data stored in the memory cell connected to the adjacent word line or bit line may be destroyed or varied. Thus, the reliability of the memory cell may be degraded.

SUMMARY

In an embodiment of the present invention, a memory system includes: a memory unit comprising a plurality of memory banks, wherein an information stored in a memory bank is accessed via a bit line and a word line; and a memory controller configured to limit repetitive accessing of a same word line or a same bit line so that the number of consecutive access is less than a predetermined critical value.

In an embodiment of the present invention, a memory controller includes: an address mapping unit configured to receive a physical address and generate a pre-address signal; an access control unit configured to generate an address signal from the pre-address signal, and delay the generation of the address signal by a predetermined time when the same pre-address signals are consecutively and repetitively inputted by a number exceeding a critical value; and an arbiter configured to receive the address signal and provide the address signal to a memory unit.

In an embodiment of the present invention, a memory system includes: a memory unit including a plurality of memory banks; and a memory controller configured to access the memory unit, wherein the memory controller includes: an address mapping unit configured to receive a physical address and generate a pre-address signal; an access control unit configured to generate an address signal from the pre-address signal, and delay the generation of the address signal by a predetermined time when the same pre-address signals are consecutively and repetitively inputted by a number exceeding a critical value; and an arbiter configured to provide the address signal to the memory unit.

In an embodiment of the present invention, a system includes: a processor; a controller configured to receive a request and a data from the processor; and a memory unit configured to receive a controlled request and the data from the controller, wherein the controller is configured to generate the controlled request, when the request for accessing a specific word line and bit line of the memory unit is successively and repeatedly generated.

In an embodiment of the present invention, a system includes: a processor; a chipset configured to couple with the processor; a controller configured to receive a request provided from the processor through the chipset; a memory device configured to receive a controlled request and the data from the controller; and an I/O device configured to couple with the chipset, wherein the controller is configured to generate the controlled request, when the request for accessing a predetermined word line and a predetermined bit line of the memory unit is consecutively and repetitively generated.

Further, the controller may be configured to delay the request for a predetermined time, thereby generating the controlled request.

In an embodiment of the present invention, a memory system includes: a memory unit comprising a plurality of memory banks, wherein an information stored in a memory bank is accessed via a bit line and a word line; and a memory controller configured to limit repetitive accessing of a same word line or a same bit line over a predetermined time period.

BRIEF DESCRIPTION OF THE DRAWINGS

Features, aspects, and embodiments are described in conjunction with the attached drawings, in which.

DETAILED DESCRIPTION

Hereinafter, a memory controller and a memory system including the same according to the present invention will be described below with reference to the accompanying drawings through exemplary embodiments.

Figure 2:
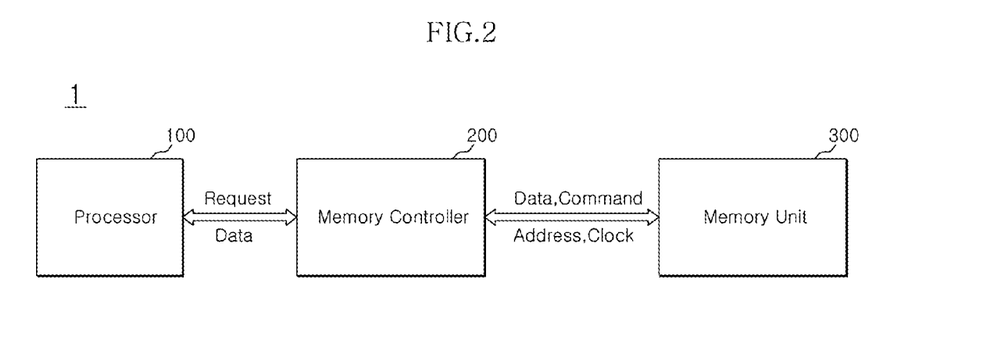
FIG. 2 schematically illustrates the configuration of a memory system according to one embodiment of the present invention.

Referring to FIG. 2, the memory system 1 may include a processor 100, a memory controller 200, and a memory unit 300. The processor 100 may operate as a host and may be configured to transmit a request and data to the memory controller 200. The request may include a physical address, a write request and a read request and the like. The physical address, the write request and the read request may be provided to perform a read or write operation of the memory unit 300. The processor 100 may transmit data to the memory controller 200, in order to store the data in the memory unit 300. The memory controller 200 may transmit data provided from the memory unit 300 to the processor 100.

The memory controller 200 may be configured to relay communication between the processor 100 and the memory unit 300. The memory controller 200 may receive requests and data from the processor 100 and provide signals such as data, command, address, and clock, to the memory unit 300. Furthermore, the memory controller 200 may provide data provided from the memory unit 300 to the processor 100.

The memory unit 300 may include a plurality of memory banks (not shown). Each of the memory banks may include a plurality of memory cells and a plurality of word lines and bit lines electrically connected to the memory cells.

Figure 3:
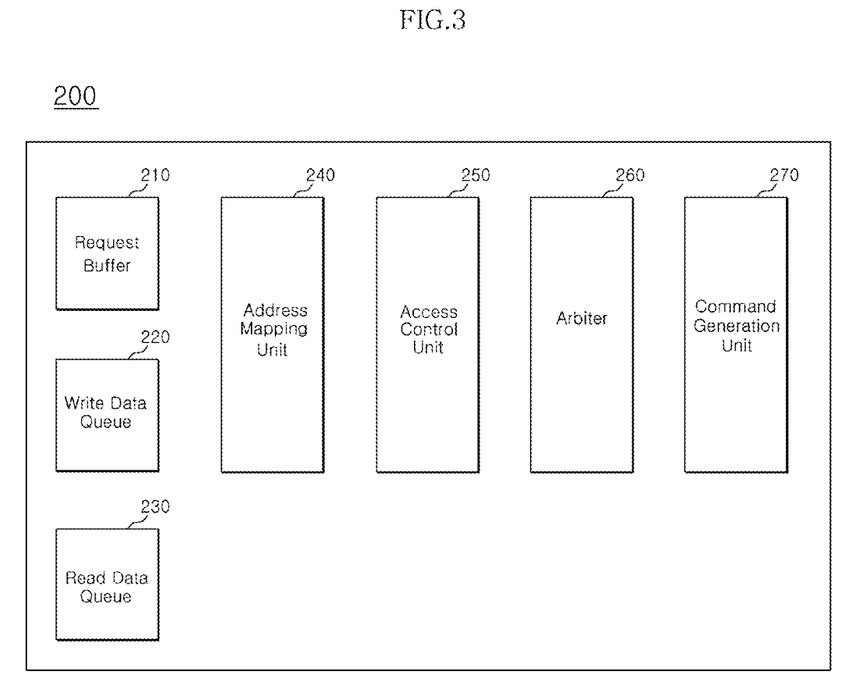
FIG. 3 schematically illustrates the configuration of a memory controller of FIG. 2.

Referring to FIG. 3, the memory controller 200 may include a request buffer 210, a write data queue 220, a read data queue 230, an address mapping unit 240, an access control unit 250, an arbiter 260, and a command generation unit 270. The request buffer 210 may be configured to receive a request provided from the processor 100. The write data queue 220 may be configured to receive data provided from the processor 100. The read data queue 230 may be configured to receive data provided from the memory unit 300.

The address mapping unit 240 may be configured to generate a pre-address signal using a physical address signal provided from the request buffer 210. The access control unit 250 may be configured to generate an address signal from the pre-address signal. The arbiter 260 may be configured to provide the address signal and the data received by the write data queue 220 to the memory unit 300, and provide data received from the memory unit 300 to the read data queue 230. The command generation unit 270 may be configured to generate write and read commands from write and read requests provided from the request buffer 210 and provide the generated write and read commands to the memory unit 300.

Although successive access requests for activation a same word line or a same bit line of a memory bank among the plurality of memory banks of the memory unit 300 are made from the processor 100, the memory controller 200 may block the successive access requests. The processor 100 may transmit a request to the memory controller 200 so as to request an access to the memory unit 300. The processor 100 may make successive access requests to the same word line or bit line of the same memory bank of the memory unit 300.

When the processor 100 makes successive access requests to the same word line or the same bit line of the memory bank of the memory unit 300, the memory controller 200 may be configured to block or delay the access requests in case where the number of access requests corresponds to a predetermined critical value. That is, the memory controller 200 may be configured to limit consecutive accessing of the same word line the same bit line, so that the number of consecutive access is less than a predetermined critical value over a predetermined time period. Therefore, when access requests of which the number exceeds the predetermined critical value are made to the same word line or the same bit line of the memory bank of the memory unit 300, the memory controller 200 executes the access requests after a predetermined time passes to prevent a variation of the data. The consecutive access requests to the same word line or the same bit line of the memory bank of the memory unit 300 may be determined based on an address signal.

Further, the memory controller 200 may be configured to limit repetitive accessing of a same word line or a same bit line over a predetermined time period.

Figure 4:
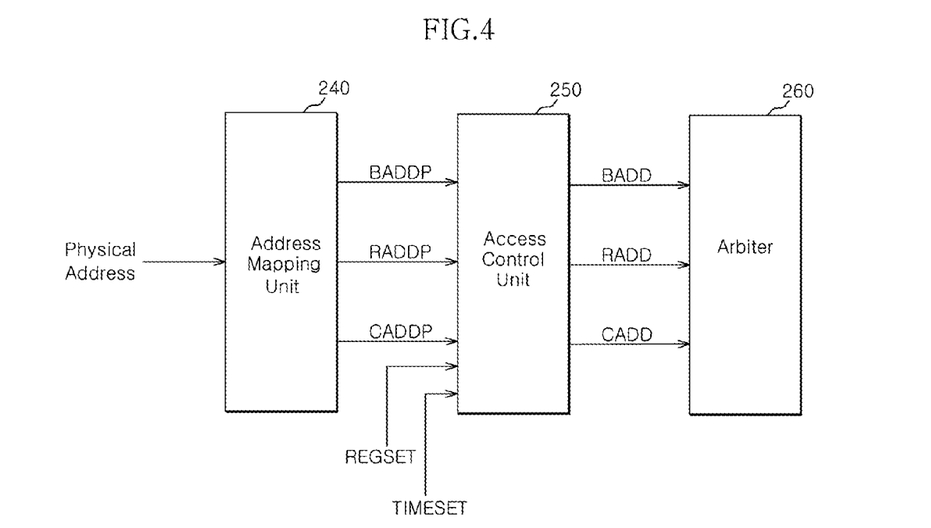
FIG. 4 illustrates the detailed configuration of an address mapping unit, an access control unit, and an arbiter of FIG. 3.

Referring to FIG. 4, the address mapping unit 240 may generate the pre-address signal using the physical address signal provided form the request buffer 210 in FIG. 3. The pre-address signal may include a pre-bank address BADDP, a pre-row address signal RADDP, and a pre-column address signal CADDP.

The access control unit 250 may receive the pre-address signal and generates the address signal. The address signal may include a bank address BADD, a row address signal RADD, and a column address signal CADD. The access control unit 250 may delay the generation of the address signal by a predetermined time, when the specific pre-address signal, for example, the same pre-address signal are consecutively and repetitively inputted by the number corresponding to the predetermined critical value. The access control unit 250 may delay the generation of the bank address signal BADD, the row address signal RADD, and the column address signal CADD using a pre-bank address signal BADDP, a pre-row address signal RADDP, and a pre-column address signal CADDP, which are currently inputted, by a predetermined time, when the same pre-bank address signals BADDP and the same pre-row address signals RADDP are consecutively and repetitively inputted by the number corresponding to the predetermined critical value. Furthermore, the access control unit 250 may delay the generation of the bank address signal BADD, the row address signal RADD, and the column address signal CADD using a pre-bank address signal BADDP, a pre-row address signal RADDP, and a pre-column address signal CADDP, which are currently inputted, by a predetermined time, when the same pre-bank address signals BADDP and the same pre-column address signals CADDP are consecutively and repetitively inputted by the number corresponding to the critical value. Further, the predetermined time may correspond a time which may be removed an effect of data inputted in a previous stage (please check whether our understanding is right).

The access control unit 250 may further receive a critical value setting signal REGSET and a time setting signal TIMESET. The access control unit 250 may set the predetermined critical value in response to the critical value setting signal REGSET, and may set the predetermined time for delaying the generation of the address signal in response to the time setting signal TIMESET. The predetermined critical value and the predetermined time may be not set to specific values, but may be set according to a designer's intention or derived through an experiment or test.

The arbiter 260 may receive the address signals and provide the address signal to the memory unit 300, as output signals of the arbiter 260. The arbiter 260 may receive the bank address signal BADD, the row address signal RADD, and the column address signal CADD and provide the received signals to the memory unit 300. The pre-bank address signal BADDP and the bank address signal BADD may be signals for selecting one of the memory banks of the memory unit 300. The pre-row address signal RADDP and the row address signal RADD may be signals for selecting one of the word lines of the memory unit 300. The pre-column address signal CADDP and the column address signal CADD may be signals for selecting one of the bit lines of the memory unit 300. The pre-address signal and the address signal may include a plurality of bits, respectively. In an embodiment of the present invention, when it is said that same pre-address signals are inputted, it also includes the meaning that a pre-address signal having a predetermined logic bits are repetitively inputted. Furthermore, when it is said that address signals are inputted, it also includes the meaning that an address signal having a predetermined logic bits are repetitively inputted.

Furthermore, the predetermined logic bits of the pre-address signal and those of the address signal may be substantially identical to each other.

Figure 5:
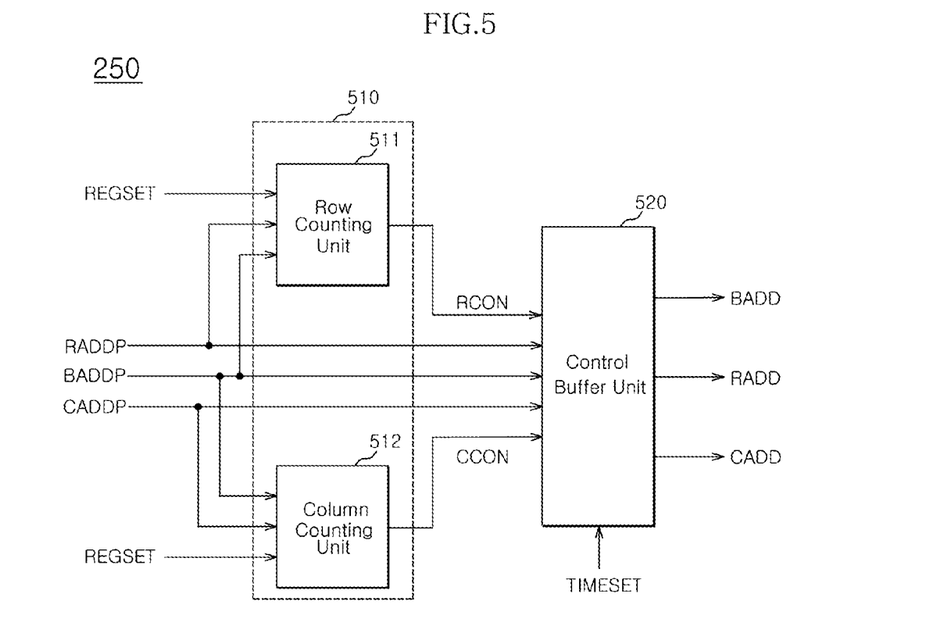
FIG. 5 schematically illustrates the configuration of the access control unit of FIG. 4.

Referring to FIG. 5, the access control unit 250 may include a counting unit 510 and a control buffer unit 520. The counting unit 510 may be configured to receive a pre-address signal, and generate a control signal, when the same pre-address signals are consecutively inputted by the number corresponding to the predetermined critical value. The counting unit 510 may receive the predetermined critical value setting signal REGSET and set the predetermined critical value.

The counting unit 510 may include a row counting unit 511 and a column counting unit 512. The row counting unit 511 may be configured to receive the pre-bank address signal BADDP and the pre-row address signal RADDP, and generate a first control signal RCON, when the same pre-bank address signals BADDP and the same pre-row address signals RADDP are successively inputted by the number corresponding to the predetermined critical value, that is, when the pre-bank address signals BADDP having the predetermined logic bits and the pre-row address signals RADDP having the predetermined logic bits are consecutively and repetitively inputted by the number corresponding to the predetermined critical value (Please check this whether our understandings are right). The column counting unit 512 may be configured to receive the pre-bank address signal BADDP and the pre-column address signal CADDP, and generate a second control signal CCON, when the predetermined pre-bank address signals BADDP and the predetermined pre-column address signals CADDP are successively inputted by the number corresponding to the predetermined critical value, that is, when the pre-bank address signals BADDP having the predetermined logic bits and the pre-column address signals CADDP having the predetermined logic bits are consecutively and repetitively inputted by the number corresponding to the predetermined critical value (Please check this whether our understandings are right).

The control buffer unit 520 may be configured to generate the address signal using the pre-address signal in response to the control signal. The control buffer unit 520 may provide the pre-address signal as the address signal when the control signal is disabled. The control buffer unit 520 may delay the pre-address signal by a predetermined time and provide the delayed signal as the address signal when the control signal is enabled.

The control buffer unit 520 may receive the first and second control signals RCON and CCON provided from the counting unit 510. When both of the first and second control signals RCON and CCON are disabled, the control buffer unit 520 may output the pre-bank address signal BADDP, the pre-row address signal RADDP, and the pre-column address signal CADDP, which are inputted in a current stage (Hereinafter, a current pre-bank address signal BADDP, a current pre-low address signal RADDP and a current pre-column address signal CADDP), as the bank address signal BADD, the row address signal RADD, and the column address signal CADD, respectively. However, when any one of the first and second control signals RCON and CCON is enabled, the control buffer unit 520 may delay the pre-bank address signal BADDP, the pre-row address signal RADDP, and the pre-column address signal CADDP, which are currently inputted, by a predetermined time and then output the delayed signals as the bank address signal BADD, the row address signal RADD, and the column address signal CADD which corresponds to output signals of the control buffer unit 520, respectively. The control buffer unit 520 may set the predetermined time in response to the time setting signal TIMESET.

Figure 6:
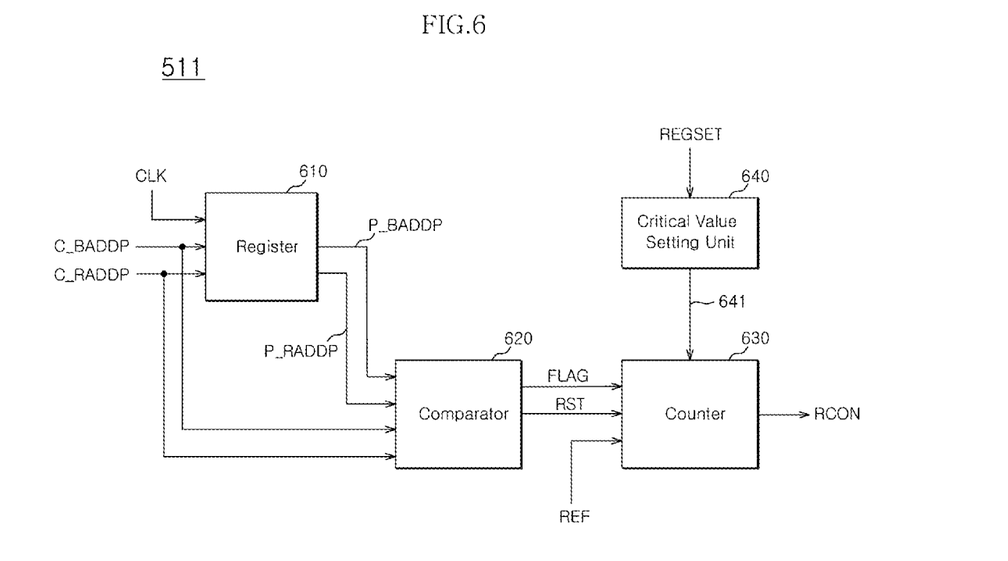
FIG. 6 illustrates the configuration of a row counting section of FIG. 5.

Referring to FIG. 6, the row counting unit 511 may include a register 610, a comparator 620, and a counter 630. The register 610 may be configured to store a pre-bank address signal BADDP and a pre-row address signal RADDP, which were inputted in a previous stage (Hereinafter, a previous pre-bank address signal P_BADDP and a previous pre-low address signal P_RADDP). Furthermore, the register 610 may be configured to output the previous pre-bank address signal P_BADDP and the previous pre row-address signal P_CADDP, to the comparator 620 and restore the current pre-bank address signal C_BADDP and the current pre-row address signal C_RADDP.

The comparator 620 may be configured to output selected one of a flag signal and a reset signal RST according to comparing results between the previous pre-address signals and the current pre-address signals. For example, the comparator 620 may be configured to receive the previous pre-bank address signal P_BADDP and the previous pre-row address signal P_RADDP provided from the register 610. Furthermore, the comparator 620 may be configured to receive the current pre-bank address signal C_BADDP and the current pre-row address signal C_RADDP. The comparator 620 may determine whether the previous pre-bank address signal P_BADDP and the previous pre-row address signal P_RADDP are identical to the current pre-bank address signal C_BADDP and the current pre-row address signal C_RADDP, respectively. The comparator 620 may generate the flag signal FLAG, when the previous pre-bank address signal P_BADDP and the previous pre-row address signal P_RADDP are identical to the current pre-bank address signal C_BADDP and the current pre-row address signal C_RADDP, respectively. Further the comparator 620 may generate the reset signal RST when the previous pre-bank address signal P_BADDP and the previous pre-row address signal P_RADDP are different from the current pre-bank address signal C_BADDP and the current pre-row address signal C_RADDP, respectively.

The counter 630 may be configured to count the flag signal FLAG. The counter 630 may be reset in response to the reset signal RST and a refresh signal REF. The counter 630 may count the flag signal FLAG, and generate the first control signal RCON, when the counting number exceeds the predetermined critical value.

The row counting unit 511 may further include a critical value setting unit 640. The critical value setting unit 640 may be configured to set the predetermined critical value in response to the critical value setting signal REGSET, and provide the predetermined critical value information 641 to the counter 630. The critical setting unit 640 may be implemented as a circuit such as a register.

When the same pre-bank address signals BADDP and the same pre-row address signals RADDP are successively inputted by the number exceeding the predetermined critical value, that is, when the current pre-address signals C_BADDP and C_RADDP are consecutively same with the previous pre-address signal P_BADDP and P_RADDP by number exceeding the predetermined critical value (please check this), the comparator 620 may generate the flag signal FLAG as the number exceeding the predetermined critical value, and the counter 630 may count the flag signal FLAG to generate the first control signal RCON. When the same pre-bank address signals BADDP and the same pre-row address signals RADDP are inputted by a number less than the predetermined critical value, and a different pre-bank address signal BADDP and a pre-row address signal RADDP are then inputted, that is, the current pre-address signals C_BADDP and C_RADDP are different from the previous pre-address signal P_BADDP and P_RADDP, the comparator 620 may generate the reset signal RST to reset the counting value of the counter 630. Then, when the same pre-bank address signals BADDP and the same pre-row address signals RADDP may be inputted by the number corresponding to the predetermined critical value, the counter 630 may input the first control signal RCON.

The counter 630 may be reset in response to a refresh signal REF. The refresh signal REF may be generated from a refresh command for controlling the memory unit 300 to perform a refresh operation. When the memory unit 300 performs a refresh operation, data stored in a memory cell of the memory unit 300 may be maintained. Therefore, the memory cell may endure successive accesses of which the number corresponds to the predetermined critical value.

The column counting unit 512 of FIG. 5 may have the same configuration as the row counting unit 511 except for a part of input and output signals. That is, the column counting unit 512 may receive the pre-column address signal CADDP instead of the pre-row address signal RADDP, and output the second control signal CCON instead of the first control signal RCON. Since the other components are configured in the same manner as the row counting unit 511, the detailed descriptions thereof are omitted herein.

Figure 7:
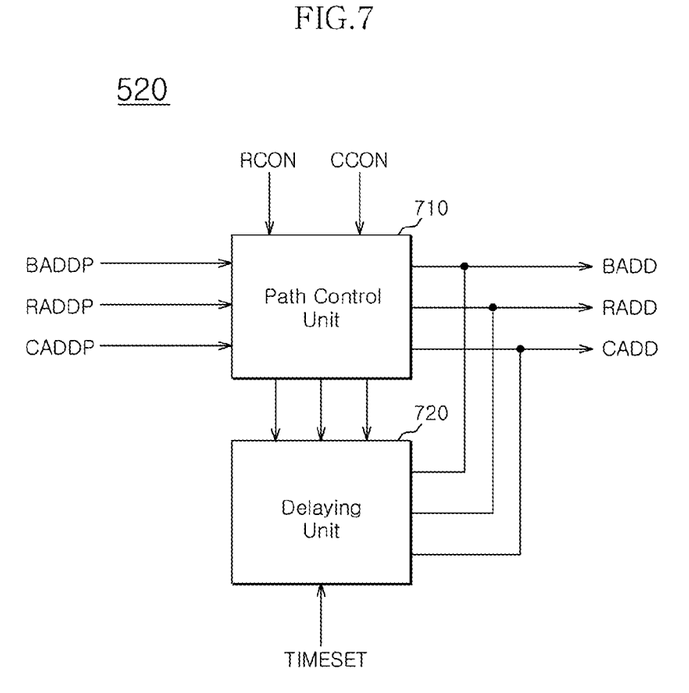
FIG. 7 illustrates the configuration of a control buffer unit of FIG. 5.

Referring to FIG. 7, the control buffer unit 520 may include a path control unit 710 and a delaying unit 720. The path control unit 710 may be configured to bypass the pre-address signal and provide the bypassed signal as the address signal in response to the control signal, or provide the pre-address signal to the delaying unit 720. The path control unit 710 may bypass the pre-bank address signal BADDP, the pre-row address signal RADDP, and the pre-column address signal CADDP and provide the bypassed signals as the bank address signal BADD, the row address signal RADD, and the column address signal CADD, respectively, in response to the first and second control signals RCON and CCON. The path control unit 710 may provide the pre-bank address signal BADDP, the pre-row address signal RADDP, and the pre-column address signal CADDP to the delaying unit 720. More detailed, when both of the first and second control signals RCON and CCON are disabled, the path control unit 710 may bypass a pre-bank address signal BADDP, a pre-row address signal RADDP, and a pre-column address signal CADDP which are inputted in the current stage, and directly provide the bypassed signals as the bank address signal BADD, the row address signal RADD, and the column address signal CADD, respectively. When any one of the first and second control signals RCON and CCON is enabled, the path control unit 710 may output the pre-bank address signal BADDP, the pre-row address signal RADDP, and the pre-column address signal CADDP, which are inputted in the current stage, to the delaying unit 720.

The delaying unit 720 may be configured to receive the pre-address signal from the path control unit 710, delay the pre-address signal by the predetermined time, and provide the delayed signal as the address signal. The delaying unit 720 may receive the time setting signal TIMESET to set the predetermined time. The delaying unit 720 may be implemented as a variable delay unit capable of changing the predetermined time according to the time setting time TIMESET. The delaying unit 720 may delay the pre-bank address signal BADDP, the pre-row address signal RADDP, and the pre-column address signal CADDP, which are inputted in the current stage from the path control unit 710, by the predetermined time provided by the time setting signal TIMESET and then provide the delayed signals as the bank address signal BADD, the row address signal RADD, and the column address signal CADD, respectively.

When the same physical addresses are consecutively and repetitively inputted to the memory controller 200 from the processor 100, the address mapping unit 240 of the memory controller 200 may successively generates the same pre-bank address signals BADDP, the same pre-row address signals RADDP, and the same column address signal CADDP. The access control unit 250 of the memory controller 200 may delay the pre-bank address signal BADDP, the pre-row address signal RADDP, and the pre-column address signal CADDP by the predetermined time and generate the bank address signal BADD, the row address signal RADD, and the column address signal CADD, when the same pre-bank address signals BADDP, the same pre-row address signals RADDP, and the same pre-column address signals CADDP are consecutively and repetitively inputted by the number corresponding to the predetermined critical value. Therefore, the memory controller 200 may delay the generation of the address signal, and block successive accesses, of which the number exceeds the predetermined critical value, to the same word line or the same bit line of the memory bank of the memory unit 300.

The memory controller discussed above are particular useful in the design of memory devices, processors, and computer systems. For example, referring to FIG. 8, a block diagram of a system employing a memory controller in accordance with embodiments of the invention is illustrated and generally designated by a reference numeral 1000. The system 1000 may include one or more processors or central processing units ("CPUs") 1100. The CPU 1100 may be used individually or in combination with other CPUs. While the CPU 1100 will be referred to primarily in the singular, it will be understood by those skilled in the art that a system with any number of physical or logical CPUs may be implemented A chipset 1150 may be operably coupled to the CPU 1100. The chipset 1150 is a communication pathway for signals between the CPU 1100 and other components of the system 1000, which may include a memory controller 1200, an input/output ("I/O") bus 1250, and a disk drive controller 1300. Depending on the configuration of the system, any one of a number of different signals may be transmitted through the chipset 1150, and those skilled in the art will appreciate that the routing of the signals throughout the system 1000 can be readily adjusted without changing the underlying nature of the system.

Figure 8:
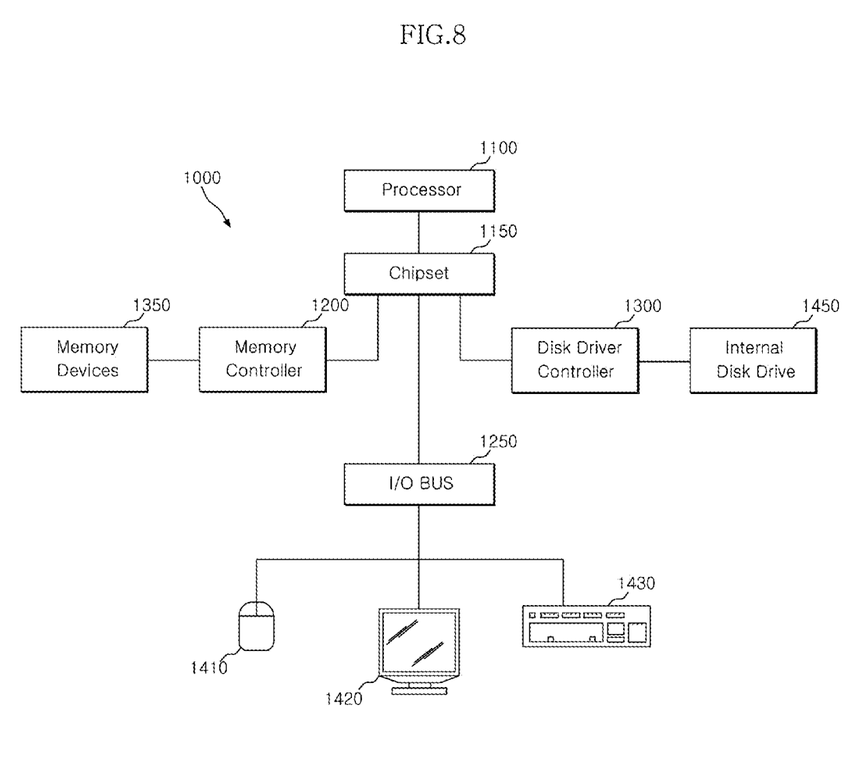
FIG. 8 illustrates a block diagram of a system employing a memory controller circuit in accordance with embodiments of the present invention

As stated above, the memory controller 1200 may be operably coupled to the chipset 1150. The memory controller 1200 may include at least one memory controller which delays the generation of the address signal, and blocks consecutive accesses, of which the number exceeds the predetermined critical value, to the same word line or the same bit line of a selected memory bank of the memory unit. Thus, the memory controller 1200 can receive a request provided from the CPU 1100, through the chipset 1150. In alternate embodiments, the memory controller 1200 may be integrated into the chipset 1150. The memory controller 1200 may be operably coupled to one or more memory devices 1350. In an embodiment, the memory devices 1350 may be corresponded to the memory unit 300 in FIG. 2, the memory unit 300 may include a plurality of word lines and a plurality of bit lines for defining a plurality of memory cell. The memory devices 1350 may be any one of a number of industry standard memory types, including but not limited to, single inline memory modules ("SIMMs") and dual inline memory modules ("DIMMs"). Further, the memory devices 1350 may facilitate the safe removal of the external data storage devices by storing both instructions and data.

The chipset 1150 may also be coupled to the I/O bus 1250. The I/O bus 1250 may serve as a communication pathway for signals from the chipset 1150 to I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420, and 1430. Further, the I/O bus 1250 may be integrated into the chipset 1150.

The disk drive controller 1450 may also be operably coupled to the chipset 1150. The disk drive controller 1450 may serve as the communication pathway between the chipset 1150 and one or more internal disk drives 1450. The internal disk drive 1450 may facilitate disconnection of the external data storage devices by storing both instructions and data. The disk drive controller 1300 and the internal disk drives 1450 may communicate with each other or with the chipset 1150 using virtually any type of communication protocol, including all of those mentioned above with regard to the I/O bus 1250.

It is important to note that the system 1000 described above in relation to FIG. 8 is merely one example of a system employing a memory controller having function for selectively delaying address signals. In alternate embodiments, such as cellular phones or digital cameras, the components may differ from the embodiment shown in FIG. 8.

While certain embodiments have been described above, it will be understood to those skilled in the art that the embodiments described are by way of example only. Accordingly, the memory system described herein should not be limited based on the described embodiments. Rather, the memory system described herein should only be limited in light of the claims that follow when taken in conjunction with the above description and accompanying drawings.

What is claimed is:

1. A memory controller comprising:
   an address mapping unit configured to receive a physical address and generate a pre-address signal;
   an access control unit configured to generate an address signal from the pre-address signal, and delay the generation of the address signal by a predetermined time when pre-address signals which have same logic bits are consecutively and repetitively inputted by a number exceeding a critical value; and
   an arbiter configured to receive the address signal and provide the address signal to a memory unit.

2. The memory controller according to claim 1, wherein the access control unit comprises:
   a counting unit configured to receive the pre-address signal and a critical value setting signal and generate a control signal when the pre-address signals which have same logic bits are consecutively and repetitively inputted by a number corresponding to the critical value; and
   a control buffer unit configured to provide the pre-address signal as the address signal in response to the control signal, or delay the pre-address signal by the predetermined time and then provide the delayed signal as the address signal.

3. The memory controller according to claim 2, wherein the counting unit comprises:
   a register configured to output a previous-inputted pre-address signal and store a currently-inputted pre-address signal in response to a clock signal;
   a comparator configured to compare the previously-inputted pre-address signal to a currently-inputted pre-address signal and generate a flag signal and a reset signal; and
   a counter configured to count the flag signal and generate the control signal when a counting number of the flag signal exceeds the critical value.

4. The memory controller according to claim 3, wherein the comparator is configured to generate the flag signal when the previously-inputted pre-address signal and the currently-inputted pre-address signal are substantially identical to each other, and generate the reset signal, when the previously-inputted pre-address signal and the currently-inputted pre-address signal are different from each other.

5. The memory controller according to claim 4, wherein the counter is configured to count the flag signal, and be reset in response to the reset signal and a refresh signal.

6. The memory controller according to claim 3, further comprising a critical value setting unit configured to receive the critical value setting signal and provide information on the critical value to the counter.

7. The memory controller according to claim 2, wherein the control buffer unit comprises:
   a path control unit configured to bypass the pre-address signal and provide the bypassed signal as the address signal or input the pre-address signal to a delay unit in response to the control signal; and
   the delay unit configured to delay the pre-address signal received from the path control unit by the predetermined time and provide the delayed signal as the address signal.

8. The memory controller according to claim 7, wherein the predetermined time is varied according to a time setting signal.

9. A memory system comprising:
   a memory unit comprising a plurality of memory banks; and
   a memory controller configured to access the memory unit, wherein the memory controller comprises:
   an address mapping unit configured to receive a physical address and generate a pre-address signal;
   an access control unit configured to generate an address signal from the pre-address signal, and delay the generation of the address signal by a predetermined time when pre-address signals which have same logic bits are consecutively and repetitively inputted by a number exceeding a critical value; and
   an arbiter configured to provide the address signal to the memory unit.

10. he memory system according to claim 9, wherein the pre-address signal comprises a pre-bank address signal, a pre-row address signal, and a pre-column address signal, and the address signal comprises a bank address signal, a row address signal, and a bank address signal.

11. The memory system according to claim 10, wherein the access control unit comprises:
- a row counting unit configured to receive the pre-bank address signal and the pre-row address signal, and generate a first control signal, when the same pre-bank address signals and the same pre-row address signals are consecutively and repetitively inputted by a number corresponding to the critical value;
- a column counting unit configured to receive the pre-bank address signal and the pre-column address, and generate a second control signal, when the same pre-bank address signals and the same pre-column address signals are consecutively and repetitively inputted by the number corresponding to the critical value; and
- a control buffer unit configured to generate the bank address signal, the row address signal, and a column address signal from the pre-bank address signal, the pre-row address signal, and the pre-column address signal in response to the first and second control signals.

12. The memory system according to claim 11, wherein the row counting unit comprises:
- a register configured to output a previously-inputted pre-bank address signal and a previously-inputted pre-row address signal and store a currently-inputted pre-bank address signal and a currently-inputted pre-row address signal, in response to a clock signal;
- a comparator configured to compare the previously-inputted pre-bank address signal and the previously-inputted pre-row address signal to the currently-inputted pre-bank address signal and the currently-inputted pre-row address signal, and generate a flag signal and a reset signal; and
- a counter configured to count the flag signal and generate the first control signal when a counting number of the flag signal exceeds the critical value.

13. The memory system according to claim 12, wherein the comparator is configured to enable the flag signal, when the previously-inputted pre-bank address signal and the previously-inputted pre-row address signal are substantially identical to the currently-inputted pre-bank address signal and the currently-inputted pre-row address signal, and enable the reset signal, when the previously-inputted pre-bank address signal and the previously-inputted pre-row address signal are different from the currently-inputted pre-bank address signal and the currently-inputted pre-row address signal which are currently inputted.

14. The memory system according to claim 13, wherein the control buffer unit comprises:
- a path control unit configured to bypass the pre-bank address signal, the pre-row address signal, and the pre-column address signal and provide the bypassed signals as the bank address signal, the row address signal, and the column address signal in response to the first and second control signals, or output the pre-bank address signal, the pre-row address signal, and the pre-column address signal to a delay unit; and
- the delay unit configured to delay the pre-bank address signal, the pre-row address signal, and the pre-column address signal by a predetermined time and provide the delayed signals as the bank address signal, the row address signal, and the column address signal.

15. The memory system according to claim 12, wherein the counter is configured to count the flag signal, and be reset in response to the reset signal and a refresh signal.

16. The memory system according to claim 11, wherein the column counting unit comprises:
- a register configured to output a previously-inputted pre-bank address signal and a previously-inputted pre-column address signal and store a currently-inputted pre-bank address signal and a currently-inputted pre-column address signal, in response to a clock signal;
- a comparator configured to compare the previously-inputted pre-bank address signal and the previously-inputted pre-column address signal to the currently-inputted pre-bank address signal and the currently-inputted pre-column address signal, and generate a flag signal and a reset signal; and
- a counter configured to count the flag signal and generate the second control signal when a counting number of the flag signal exceeds the critical value.

17. The memory system according to claim 16, wherein the comparator is configured to enable the flag signal, when the previously-inputted pre-bank address signal and the previously-inputted pre-column address signal are substantially identical to the currently-inputted pre-bank address signal and the currently-inputted pre-column address signal, and enable the reset signal, when the previously-inputted pre-bank address signal and the previously-inputted pre-column address signal are different from the currently-inputted pre-bank address signal and the currently-inputted pre-column address signal.

18. The memory system according to claim 16, wherein the counter is configured to count the flag signal, and be reset in response to the reset signal and a refresh signal.

\* \* \* \* \*